US006024364A

United States Patent [19]

Steffen

[11] Patent Number: 6,024,364

[45] Date of Patent: Feb. 15, 2000

[54] ALL-PURPOSE SEALING PROFILE

[75] Inventor: Friedhelm Steffen, Weiskirchen, Germany

[73] Assignee: Saar-Gummiwerk GmbH, Wadern-Büschfeld, Germany

[21] Appl. No.: 08/732,285

[22] PCT Filed: Feb. 13, 1996

[86] PCT No.: PCT/DE96/00238

§ 371 Date: Oct. 28, 1996

§ 102(e) Date: Oct. 28, 1996

[87] PCT Pub. No.: WO96/29497

PCT Pub. Date: Sep. 26, 1996

[30] Foreign Application Priority Data

Mar. 23, 1995 [DE] Germany ........................... 195 10 597

[51] Int. Cl.[7] ........................................................ F16J 15/00

[52] U.S. Cl. ............................................ 277/645; 277/644

[58] Field of Search .................................... 277/181, 645, 277/644, 648, 637

[56] References Cited

FOREIGN PATENT DOCUMENTS

| | | |
|---|---|---|
| 8534283 | 4/1986 | Germany . |
| 9207608 | 8/1992 | Germany . |

*Primary Examiner*—Daniel G. DePumpo
*Attorney, Agent, or Firm*—James Creighton Wray; Meera P. Narasimhan

[57] ABSTRACT

A seal that can be used in groove surfaces, in permanent glasswork, or in casement windows and is comprised of a sealing profile 1 having a profile base 3 and an anchoring wedge 2. On the side of the profile base 3 that is opposite the anchoring wedge 2, a sealing pad 4 and a sealing lip 5 are formed, and a nose strip 6 is positioned on the end of the sealing pad 4. These parts of the sealing profile 1 are made of a thermoplastic rubber. They are to be joined to the semi-finished closure of the window shortly following extrusion by the manufacturer. The corresponding semi-finished product can then be cut to size and joined by the window builder with the sealing profiles 1 being bonded together at the same time so that the entire seal is guaranteed. This makes the window builder's step of "inserting the sealing profile" completely unnecessary.

20 Claims, 1 Drawing Sheet

ALL-PURPOSE SEALING PROFILE

BACKGROUND OF THE INVENTION

The invention relates to a sealing profile made of an elastic material and used in the sealing of windows and similar closures, particularly synthetic casement windows comprising of an anchoring wedge 2 that can be inserted in the groove in the synthetic casement section, a sealing profile base that runs nearly parallel to the synthetic casement section, and a sealing pad and sealing lip that are positioned against the window frame or the pane of glass in order to create the seal.

Seals of this type are generally known in the art. The seal known from EP-PS 0 247 533 is comprised of a profile base. On one side, the anchoring wedge is molded. On the other side, the sealing pad and sealing lip are molded. The sealing lip is comprised of a hook-shaped component, while the sealing pad is made of microcellular rubber or some similar material that when positioned against the glass pane will press against it sufficiently. The sealing lip is slightly concave in design. This results in an increase of the sealing force achieved when the seal is pressed against the glass. The sealing lip and the sealing pad implement their sealing effect independently of one another. In other words, they are moved or reshaped by the pane of glass they are pressing against so that the necessary tightness is ensured. Another sealing profile, similar in principle, is known from EP-A-O 575 937. The profile base in this seal is equipped with notches to permit easier and more secure bending in the creation of T- and cross-joints, particularly when used with aluminum windows. The disadvantage of these sealing profiles, which are known in the art, is that they can be used only for the sealing of windows with panes of glass; while in the area of fixed glasswork or even grooved surfaces, separate sealing profile pieces that are designed to fit the specific application are necessary. Accordingly, these sealing profiles must then be pressed into the specific grooves following production. In other words, after the pane has been inserted or the closure has been mounted, they must be pressed after the finishing of each window leaf, window to create the appropriate seal tightness. Accordingly, the window builder must allow for a separate step in the process of manufacturing the window in which the different sealing profiles can be inserted. The cost associated with this is substantial, without accounting for the special measures that are necessary to ensure adequate sealing in the corners (see EP-A-O 575 937).

Therefore, the object of the invention is to create a sealing profile that can be used just as well for the three sealing points on the window or closure while eliminating the need for mounting the sealing profile on the finished window.

SUMMARY OF THE INVENTION

This goal is attained in that the profile base, anchoring wedge, and sealing pad and sealing lip are made of a thermoplastic rubber and can be joined to the semi-finished closure by pressing the anchoring wedge into the appropriate groove. (These two components are designed to have the same shape.) The sealing pad is equipped with a protruding nose strip positioned on the side of the sealing profile that faces away from the sealing lip. The sealing pad is pushed up when pressure is applied to the sealing lip.

A sealing profile of this type can be used as a stopping seal or as a glazing seal. In addition, it may be used in fixed glasswork; thus, it can be considered a truly all-purpose sealing profile. This material, comprised of thermoplastic rubber or of thermoplastic elastomer, is designed so that it can be cut along with the window sections and then assembled with the bonding of the sections by the window builder. The window builder who is to work with the 6-m. panels receives them with the seal already inserted. This can be done by machine since the seal is made of a sufficiently moldable material as indicated above. The window builder cuts these 6-m. panels as he ordinarily would, already mitred and of the proper dimensions so that they may be joined or, in the case of plastic windows, bonded together. Then, because the sealing profiles were already inserted in the beams and were cut and beveled along with the panels, they can also be bonded or joined at the corners making further costly steps unnecessary. The window builder can then take the individual windows, with or without the glass, directly to the location where they are to be installed. Once there, he can complete and install them without any further steps. This completely eliminates the step of inserting the sealing profiles for the window builder. Not only does this conserve on manpower, but it also provides a more secure seal. A precise fit is guaranteed because the all-purpose sealing profiles specified in the invention are pressed in or inserted via machine by the manufacturer of the window panels. The special design of the sealing pad with the nose strip on the end ensures an optimum seal in this area every time; this is aided by the fact that the nose strip is made to protrude when pressure is applied to the sealing lip.

In one practical embodiment of the invention, the sealing pad and sealing lip are designed as a balloon-type piece that is hollow lengthwise. This design permits a high degree of adjustability and improves on the possibility that the same seal can be used for all different types of applications. The balloon-type design increases restoring forces, resulting in an improved seal tightness.

The effect of the sealing pad and the sealing lip upon one another is improved in that the sealing pad and sealing lip are designed as separate hollow components, each running parallel to each other's axis. More specifically, the dividing wall or ridge that runs between the sealing pad and sealing lip transfers the movements of the sealing lip to the sealing pad when the pane is properly positioned against the sealing lip. The same is also true for the other areas, permitting the creation of a good double seal.

The intended effect of the sealing lip on the sealing pad can be further improved by bending the two hollow component chambers of the profile base toward the anchoring wedge in the area of the ridge that separates the hollow components. With this configuration, the rigid panel that forms the profile base can be embedded in the sealing process; this can be improved even further if the ridge is positioned at an angle. In other words, the projecting nose strip would also be at an angle. This would mean that the ridge would extend diagonally from the profile base toward the nose strip so that when pressure is applied to the sealing lip, the end of the ridge lying closer to the nose strip would shape this piece or the sealing pad correspondingly, pulling the nose strip up.

A further design possibility provides for the ridge to be bent, with the back of the angle pointing away from the nose strip. This ridge design also ensures that the nose strip is raised as a result of pressure on the sealing lip, thereby forming the seal.

In the sealing process, the nose strip should lie directly on the area that is to be sealed, a condition which is further promoted by the invention in that the side of the sealing pad containing the nose strip is angled so that the nose strip lies above the profile base. This side then extends approximately parallel to the ridge that separates the two hollow component spaces.

As indicated above, the sealing profile is inserted following the extrusion of the synthetic casement sections so that it and the window panels may be cut and bonded by the window builder. In joining the synthetic casement sections, it is necessary to press the two ends of the sealing profile against one another, causing them to form a bulge toward the outside. On the outside of the window section, the bulge will be either very small or it can be ground off completely while it remains on the inner side of the sealing profiles. This also makes wearing away more difficult as, in accordance with the invention, the sealing profile is now there. In order to prevent the sealing profile from being pushed out, and in order to make the existing bulge of plastic less visible, the invention provides for the anchoring wedge to have a foot that is open on the side facing away from the profile base. The synthetic material can be inserted into this open foot in the bonding process without difficulty. On the one hand, it will not interfere with the sealing profile, and on the other hand, it will not negatively alter the overall appearance.

To ensure that the restoring forces remain sufficient with the open design of the anchoring wedge, and to prevent hyperextension, the profile specified in the invention provides for the wall that holds the foot to be reinforced, preferably with a plastic having a higher Shore hardness. It is particularly advantageous for the wall to be made of a 40 D/60 A plastic. This plastic will guarantee the necessary restoring forces and can ensure that longitudinal hyperextension, which could result in the seal pulling out of the groove, cannot occur.

In order to avoid having to bond different types of plastics together in the processing or in the manufacturing of the sealing profile, the invention provides for the wall or the foot to contain a core comprised of harder, rigid material, preferably polypropylene. This core embedded along the entire length of the sealing profile and in the material of the sealing profile, advantageously assumes the function of the fiber, which is known in the art for preventing any hyperextension. It also gives the advantage that this second plastic material is embedded within the actual plastic material of the sealing profile making a corresponding bonding unnecessary. Additionally, this results in a more pleasing appearance. At the same time, the core provides the described, necessary facilitation in mounting to the sealing profile in the groove.

The described facilitation in mounting the sealing profile is optimally achieved when the core is unshaped, with the ends of the side ridges being anchor-shaped. These side ridges extend at right angles from the base-ridge or the profile base. This arrangement results in a spring-like effect, which also ensures the secure mounting of the foot or the anchoring wedge in the groove. It can also improve the processability of the sealing profile via machine.

The invention is particularly characterized in that a sealing profile is created that can be used for all the sealing points in a window or a closure. It is created in such a way that only one sealing profile is needed to create a seal in grooved surfaces, in fixed glasswork, or in casement windows. In addition, the sealing component, made of thermoplastic rubber (TPE), can be embedded or inserted via machine. Following the extrusion of the semi-finished product, the seal can be applied in the manufacturer's shop where the appropriate machinery is available. This ensures an optimally secure and evenly-formed application of the sealing profile. These semi-finished panels can then be cut by the window builder; that is, the seal that has already been inserted can be cut, bonded, and then further processed right along with the panels. The window builder saves a great deal in manpower and cost and is further assured that the seal has been securely and properly inserted. The sealing profile is particularly suitable as a seal because it is comprised of two separate components in the sealing area, namely the sealing lip and the sealing pad. They are properly designed and positioned to complement one another. This guarantees a permanent even seal to be created following the installation of the glass panes or the areas to be sealed. Thus, in several respects, an overall substantial improvement over the former state-of-the-art technique is ensured.

Further details and advantages of the object of the invention are provided in the following description of the attached diagrams in which a preferred embodiment of the invention, with the necessary details and individual components, is illustrated. These show:

DETAILED DESCRIPTION OF THE PREFERRED EMBODIMENT

Figure 1:
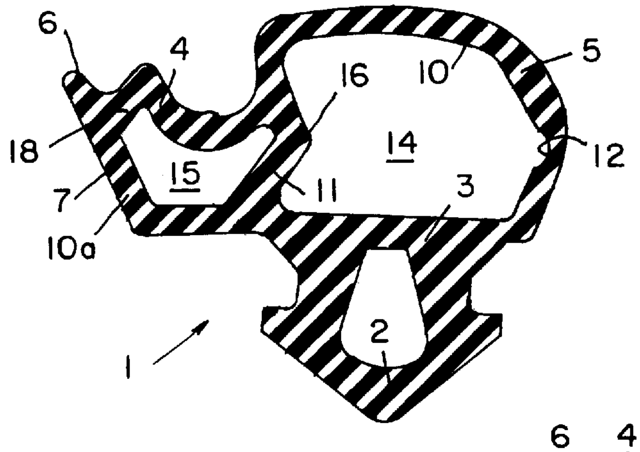
FIG. 1. A cross-section of a sealing profile having two hollow component chambers and a profile base that extends through the center.
Figure 2:
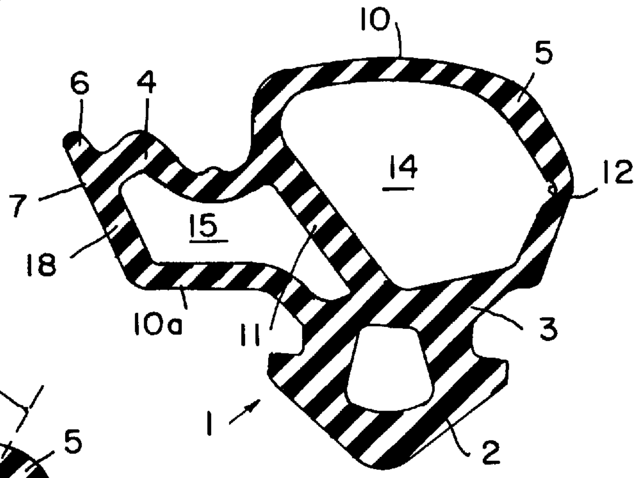
FIG. 2. A sealing profile having two chambers and the movement of a favorable profile base.

The sealing profiles illustrated in FIGS. 1 and 2 are similar in their basic principle. The sealing profile 1 is comprised of: an anchoring wedge 2 that has a closed base; the profile base 3; and the sealing pad 4 and sealing lip 5, which are positioned above the profile base.

At the end of the sealing pad 4, a nose strip 6 is located that will lie securely against the object that is to be sealed. It is positioned on the side 7 that is opposite the sealing lip 5, forming the end piece.

The sealing pad 4 and sealing lip 5 are designed as hollow components 10, 10*a* that extend longitudinally 9 along the entire sealing profile 1. While both FIGS. 1 and 2 contain two separate hollow components 10, 10*a*, separated by a ridge 11, the design illustrated in FIGS. 3 and 4 is comprised of one continuous, hollow component 10.

The installation of the component not illustrated here, for example the pane of glass, on the sealing lip 5 causes the lip to become bent. This is a condition permitted by the bending point 12. This deformation of the hollow component 10 or the hollow chamber 14 also affects the ridge 11 so that the nose strip 6 that forms the outer end of the hollow component chamber 15 is partially raised or pulled up. It is then pressed against the glass, creating the desired seal.

While in FIG. 1 the ridge 11 has an angle 16 which facilitates the shaping or the drawing up of the nose strip 6, this ridge is positioned at an angle in FIG. 2 so that it runs approximately parallel to the side 18. At the end of side 18 is the nose strip 6. The sealing profiles 1 in FIGS. 1 and 2 further differ. FIG. 1 contains a continuous profile base 3. Yet, in FIG. 2 the base dips down in the area of the ridge in order to increase flexibility.

Figure 3:
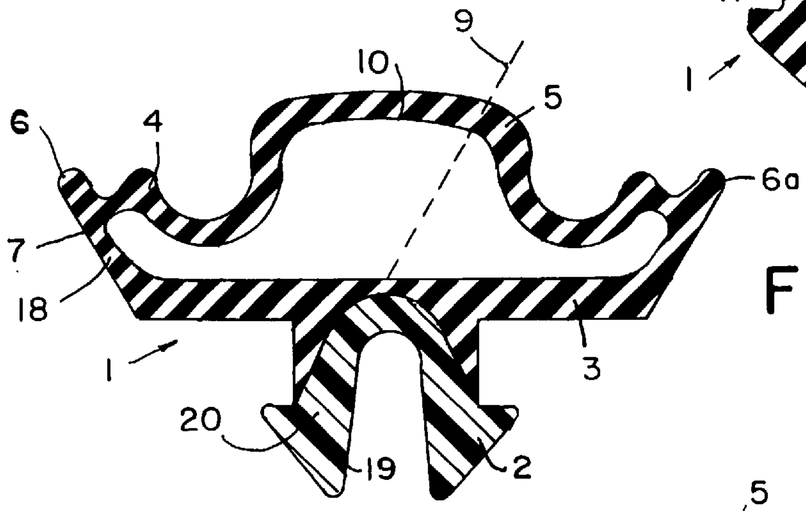
FIG. 3. A double seal profile with an open foot.
Figure 4:
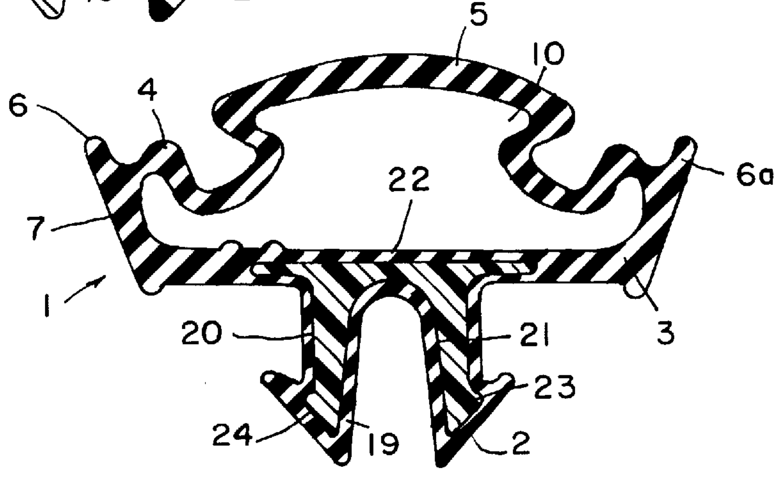
FIG. 4. A sealing profile, similar to that illustrated in FIG. 3, but with a foot having a reinforced core.

The sealing profiles illustrated in FIGS. 3 and 4 differ from FIGS. 1 and 2 first in that they contain only one hollow component 10 or one hollow chamber. Second, they differ in that they contain a nose strip on each side 6, 6*a*. Most importantly, however, the anchoring wedge 2 is designed here to fit the specific application; that is, it has a foot 19 that is open toward the bottom. This foot allows the melting residue to penetrate this area during the bonding process without causing any interference. In addition, this foot 19 and its side wall 20 are comprised of a special, harder material. With the use of a foot made of polypropylene, any hyperextension can be prevented. At the same time, the necessary rigidity needed for the effectiveness of the anchoring wedge 2 is obtained.

Finally, FIG. 4 shows a further variation in which the foot 19 is equipped with a core 21 made of a harder and less flexible material. This core 21 is equipped with a base ridge 22 that is embedded in the profile base 3 and into side ridges 23 and 24 that are at approximately right angles to one another and have anchor-shaped ends. This u-shaped design of the core 21 improves mounting in the groove (not illustrated here) because the side ridges 23 and 24 that extend from the base ridge 22 provide a spring-like effect.

In the embodiments of the invention illustrated in FIGS. 3 and 4, the nose strip 6, 6*a* positioned at the ends also becomes pushed upward as in FIGS. 1 and 2 when pressure is applied to the sealing lip 5. This creates the desired seal. The piece that serves to connect the sealing lip and sealing pad is more or less molded or bent inward in order to increase the protrusion of the nose strip 6, 6*a*.

All of the above-named characteristics, including those represented only in the diagrams, are considered essential to the invention whether they be considered by individually or as they complement each other.

I claim:

1. An elastic sealing apparatus comprising an anchoring wedge, a profiled base connected to the anchoring wedge, a sealing pad provided on the profiled base, and a sealing lip adjacent the sealing pad and the profiled base, further comprising a nose strip on the sealing pad, first and second opposite sides on the sealing pad, the nose strip being on the first side and the sealing lip on the second side, the nose strip forming a protrusion when pressure is applied to the sealing lip.

2. The apparatus of claim 1, wherein the profiled base, the anchoring wedge, the sealing pad and the sealing lip are of thermoplastic rubber material.

3. The apparatus of claim 1, further comprising a semi-finished closure having a groove, said groove being complementary to the anchoring wedge for receiving the anchoring wedge.

4. The apparatus of claim 1, wherein the sealing pad is a longitudinally extending balloon-type hollow chamber.

5. The apparatus of claim 17, wherein the sealing lip is a longitudinally extending balloon-type hollow chamber.

6. The apparatus of claim 1, wherein the sealing pad is hollow.

7. The apparatus of claim 6, wherein the sealing lip is hollow, and the sealing lip is separate from and parallel to the sealing pad.

8. The apparatus of claim 1, wherein the sealing pad and the sealing lip are separate hollow component chambers.

9. The apparatus of claim 1, wherein the first side of the sealing pad is angled to position the nose strip above the profiled base.

10. The apparatus off claim 1, further comprising a foot in the anchoring wedge.

11. The apparatus of claim 10, wherein the foot is open on a side opposite that of the profiled base.

12. The apparatus of claim 10, wherein the foot is provided on a wall of the anchoring wedge and wherein the wall is reinforced with a plastic having a high Shore hardness.

13. The apparatus off claim 12, wherein the wall is of a 40 D/60 A plastic material.

14. An elastic sealing apparatus comprising an anchoring wedge, a profiled base connected to the anchoring wedge, a sealing pad provided on the profiled base, and a sealing lip adjacent the sealing pad and the profiled base, wherein the sealing pad and the sealing lip are separate hollow component chambers, further comprising a ridge between the hollow component chambers, and wherein the profiled base proximal the ridge is bent outward towards the anchoring wedge thereby enlarging the two hollow component chambers.

15. The apparatus of claim 14, further comprising a nose strip on the sealing pad, wherein the ridge has an angle complementary to a protrusion of the nose strip.

16. The apparatus of claim 15, wherein an apex of the angle is on a side opposite that of the nose strip.

17. An elastic sealing apparatus comprising an anchoring wedge, a profiled base connected to the anchoring wedge, a sealing pad provided on the profiled base, and a sealing lip adjacent the sealing pad and the profiled base, further comprising a foot in the anchoring wedge, wherein the foot is provided on a wall of the anchoring wedge and wherein the wall is reinforced with a plastic having a high Shore hardness, further comprising cores in the wall and the foot, the cores being of a hard, stretch-proof material.

18. The apparatus of claim 17, wherein the material is polypropylene.

19. The apparatus of claim 17, wherein the core in the foot is U-shaped.

20. The apparatus of claim 19, further comprising the core having a base ridge and side ridges with respective ends, and wherein the ends of the side ridges extend at right angles from the base ridge and are anchor-shaped.

* * * * *